United States Patent
Oven et al.

(10) Patent No.: US 9,989,365 B2
(45) Date of Patent: Jun. 5, 2018

(54) DYNAMICALLY INTEGRATED NAVIGATION TESTER

(71) Applicant: Honeywell International Inc., Morris Plains, NJ (US)

(72) Inventors: James B. Oven, Plymouth, MN (US); Ross Merritt, Ramsey, MN (US); Christopher Jay Matthews, Minneapolis, MN (US); Scott Snyder, Mahtomedi, MN (US)

(73) Assignee: Honeywell International Inc., Morris Plains, NJ (US)

( * ) Notice: Subject to any disclaimer, the term of this patent is extended or adjusted under 35 U.S.C. 154(b) by 205 days.

(21) Appl. No.: 15/153,717

(22) Filed: May 12, 2016

(65) Prior Publication Data

US 2017/0328715 A1 Nov. 16, 2017

(51) Int. Cl.
*G06F 19/00* (2018.01)
*G01C 21/16* (2006.01)
*G01S 19/13* (2010.01)

(52) U.S. Cl.
CPC .............. *G01C 21/16* (2013.01); *G01S 19/13* (2013.01)

(58) Field of Classification Search
CPC .. G01C 21/165; G06T 19/006; G02B 27/017; G06F 11/00; G06F 1/163
USPC .......................... 702/122, 130, 182–185, 188
See application file for complete search history.

(56) References Cited

U.S. PATENT DOCUMENTS

| 5,093,800 | A | 3/1992 | Ifune | |
| 6,438,491 | B1* | 8/2002 | Farmer | B60W 30/16 340/435 |
| 7,826,994 | B2 | 11/2010 | Fu et al. | |
| 2005/0232512 | A1* | 10/2005 | Luk | G06K 9/6293 382/276 |
| 2005/0240347 | A1* | 10/2005 | Yang | G01C 21/16 701/500 |
| 2013/0338958 | A1* | 12/2013 | Shanishchara | G01C 25/00 702/116 |

OTHER PUBLICATIONS

European Patent Office, "Extended European Search Report for EP Application No. 17166396.6", "Foreign counterpart to U.S. Application No.", dated Jun. 26, 2017, pp. 18, Published in: EP.
CAST-4000, "GPS/INS Simulation System—Complete GPS/INS Engineering Test System", "http://castnav.com/wp-content/uploads/cast_4000.pdf", Dec. 20, 2012, pp. 1-2, Publisher: GPS/INS Simulation System.

(Continued)

*Primary Examiner* — Edward Raymond
(74) *Attorney, Agent, or Firm* — Fogg & Powerss LLC

(57) ABSTRACT

An Inertial Navigation System (INS) testing system includes a Unit Under Test (UUT) with an INS module, a DAT tool configured to provide command and control functions to a user, and a Dynamically Integrated Navigation Tester (DINT) in communication with the UUT and the DAT tool. The DINT includes a truth data conversion module configured to receive truth data and convert it to navigation data suitable for transmission to the UUT. The INS testing system advantageously allow a user to interface with a UUT while providing user-specified dynamic inputs from the DINT with the truth data selected by the user.

20 Claims, 2 Drawing Sheets

(56) References Cited

OTHER PUBLICATIONS

Siminertial, "Integrated Gps/Inertial & Inertial Sensor Test System", "https://web.archive.org/web/20160407171026/http://www.spirent.com/Products/SimINERTIAL", Apr. 7, 2016, pp. 1-3, Publisher: Spirent.

Spirent Siminertial, "Spirent Siminertial, Integrated GPS/Inertial Test", "https://web.archive.org/web/20150318213956/http://www.spirent.com/~/media/Datasheets/Positioning/SimInertial.pdf", Mar. 18, 2015, pp. 12, Publisher: Spirent.

Spirent, "GSS9000 GNSS Constellation Simulator", "https://web.archive.org/web/20160318154225/http://www.spirent.com/~/media/Datasheets/Positioning/Brochures/GSS9000.pdf", Mar. 18, 2016, pp. 1-8.

* cited by examiner

DYNAMICALLY INTEGRATED NAVIGATION TESTER

BACKGROUND

This invention relates generally to the testing of Inertial Navigation Systems (INS), and more specifically to an INS testing system under which a dynamic environment can both be simulated and tested in real-time.

Existing INS testing systems frequently include a satellite simulator in direct communication with a unit under test (UUT), which provides output data to a user through a Data Acquisition Tool (DAT). Such systems typically do not allow users to test and analyze devices dynamically under multiple input conditions quickly and easily. To perform such testing with existing INS testing systems, users are frequently required to create one or more costly large scale flight test environments. As a result, dynamic testing with conventional INS testing systems is often time consuming and expensive, and requires a range of specialized support equipment.

SUMMARY

In one embodiment, an Inertial Navigation System (INS) testing system comprises a Unit Under Test (UUT) comprising an INS module, a DAT tool configured to provide command and control functions to a user, and a Dynamically Integrated Navigation Tester (DINT) in communication with the UUT and the DAT tool. The DINT comprises a truth data conversion module and a synchronization module. The truth data conversion module is configured to receive truth data and convert it to navigation data suitable for transmission to the UUT.

The INS testing system may further comprise a satellite simulator in communication with the UUT and the DINT, or a real-time GPS data source in communication with the UUT and the DINT. The real-time GPS data source may comprise an Embedded GPS/IMU (EGI) or an Attitude Heading Reference System (AHRS). The UUT may further comprise a GPS. The DINT may further comprise an interface for receiving truth data from an external memory device. The DINT may comprise a modified version of the UUT. Inertial data may be provided by the UUT.

In another embodiment, a Dynamically Integrated Navigation Tester (DINT) comprises a synchronization module and a truth data conversion module in communication with the synchronization module. The truth data conversion module is configured to receive truth reference data and convert it to navigation data suitable for transmission to a Unit Under Test (UUT) comprising an Inertial Navigation System (INS) module. The truth data conversion module is also configured to receive command and control signals from a DAT tool and transmit corresponding command and control signals to the UUT.

The DINT may be in communication with a satellite simulator. The DINT may be configured to receive truth reference data from an external memory device. The external memory device may comprise a flash drive. The DINT may be configured to receive truth reference data from a real-time GPS data source. The real-time GPS data source may comprise an Embedded GPS/IMU (EGI) or an Attitude Heading Reference System (AHRS). The UUT may further comprise a GPS. The may comprise a modified version of the UUT.

In another embodiment, a method of performing an Inertial Navigation System (INS) test comprises receiving command and control signals from a user at a Dynamically Integrated Navigation Tester (DINT) and receiving truth data at the DINT. The method further comprises converting the truth data to navigation data suitable for transmission to a Unit Under Test (UUT) comprising an INS module and transmitting the navigation data to the UUT.

The method may further comprise synchronizing one or more timing signals with a satellite simulator. The truth data may be received from an external memory device. The truth data may be received from a real-time GPS data source.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

The present application describes an Inertial Navigation Systems (INS) testing system including a Dynamically Integrated Navigation Tester (DINT), which advantageously provides for a cost effective means of testing that is repeatable over any user-defined input conditions. The systems and methods of the present application thus advantageously meet the need of testing an INS system under all types of dynamic environments, while allowing a user to design the environment to meet whatever test needs are required. Using conventional INS testing systems, this would require a level of testing which only could be performed through some type of either flight test or possible vehicle test platform.

Figure 1:
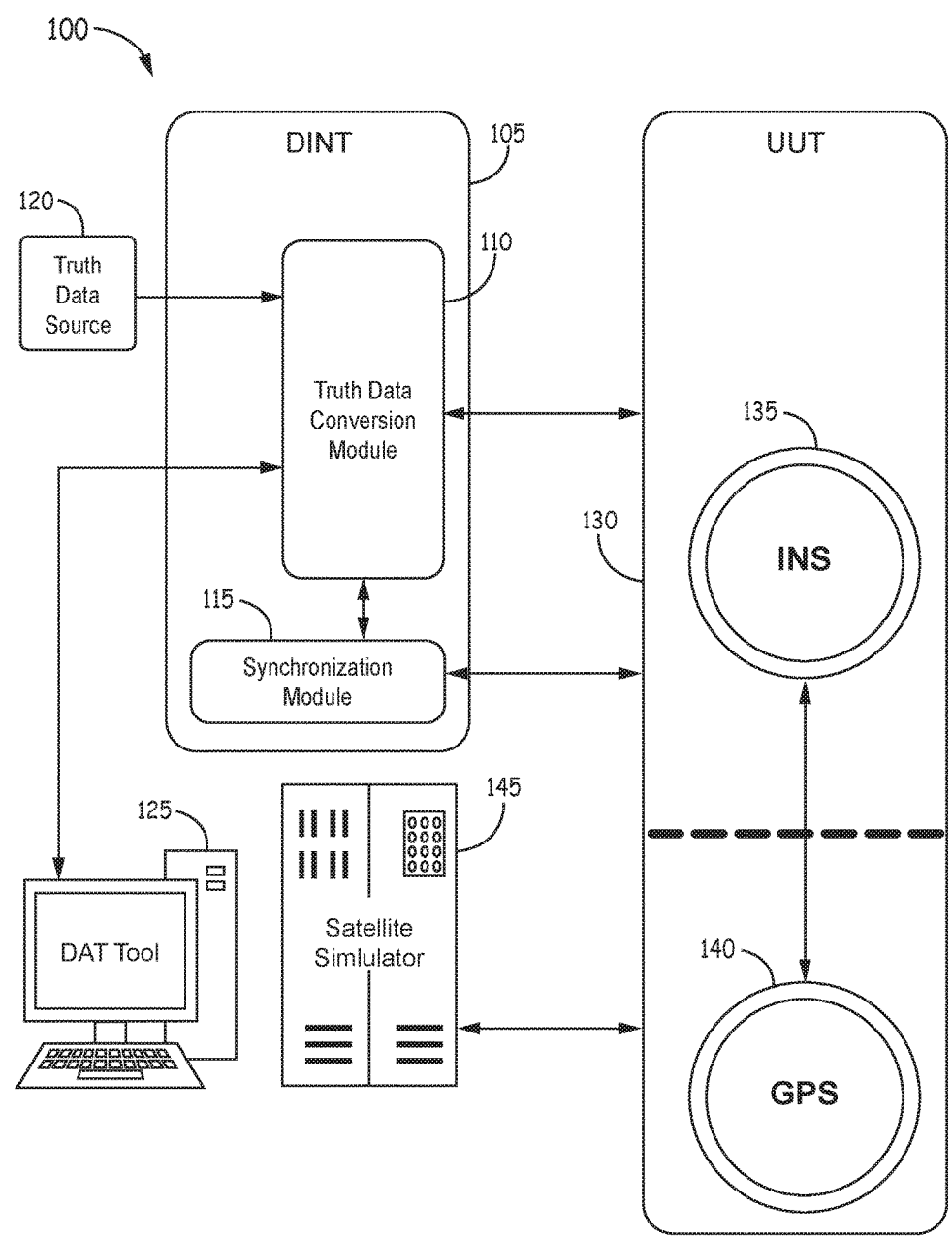
FIG. 1 illustrates a block diagram of an exemplary Inertial Navigation System (INS) testing system having a Dynamically Integrated Navigation Tester (DINT).

FIG. 1 illustrates a block diagram of an exemplary INS testing system 100 having a Dynamically Integrated Navigation Tester (DINT) 105. In the illustrated example, the DINT 105 comprises a truth data conversion module 110 in communication with a synchronization module 115 and with a truth data source 120, such as a flash drive or other suitable external memory device. The DINT 105 is in communication with an external DAT tool 125 as well as a unit under test (UUT) 130, which comprises an INS 135 and a GPS 140, in the example shown in FIG. 1. The UUT 130 is also in communication with a satellite simulator 145.

In some embodiments, the DINT 105 comprises a modified version of the UUT 130, which is configured to act as a stand-alone dynamic test device. In operation, the DINT 105 may interface with the user, the UUT 130, and the satellite simulator 145. The inertial data may be provided by either the UUT 130 or by an external simulator. In addition, the user may advantageously view and save output data from the UUT 130 via the DAT tool 125, and may use the DAT tool 125 to perform real-time command and control.

In some embodiments, during testing, the DINT 105 accepts input truth data from the user via the truth data source 120, such as, for example, a flash drive. The truth data conversion module 110 of the DINT 105 then converts the truth data to the corresponding input messages to the UUT 130, such as, for example, navigation, position, time, and other input conditions to the UUT 130. At the same time, the synchronization module 115 of the DINT 105 may be synchronizing with the satellite simulator 145 to provide RF inputs and, if needed, inertial inputs, to the UUT 130. The DINT 105 and the UUT 130 may be in communication with each other through a variety of suitable interfaces, such as, for example, a generic high speed serial data interface.

In one specific example, the UUT 130 may comprise a model HG1930 Inertial Measurement Unit (IMU) manufactured by Honeywell, the DINT 105 may comprise a modified version of the model HG1930 IMU, and the satellite simulator 145 may comprise a model CAST-4000 simulator manufactured by CAST Navigation. The truth data conversion module 110 may comprise software developed in a Xilinx design environment, which advantageously allows changes to the DINT 105 to utilize the same tools that are used for many other applications. Interfaces to the DINT 105 may advantageously utilize common interface systems and methods, which do not require any specialized equipment.

During testing, the truth data conversion module 110 may convert the truth data received from the user to the following output signals for transmission to the UUT 130: Baro Altitude Aiding, Navigation (Transfer Align), Magnetic Heading Aiding, and GPS PVT Time Mark Data. The truth data conversion module 110 may also receive the following signals from the user via the DAT tool 125, and convert them to corresponding output signals for transmission to the UUT 130: Application Specific Signals, Configuration Initialization, Command and Mode Control, and Output Message Enable.

The synchronization module 115 may receive a GPS Time signal from the truth data conversion module 110 and may provide a Time Offset signal to the truth data conversion module 110. In addition, the synchronization module may generate a Time Mark In Data signal and a Time Mark Out Data signal for transmission to the UUT 130, and may receive a Time Mark Out Data signal from the UUT 130. The satellite simulator 145 may generate an RF signal, which is received by the GPS 140 of the UUT 130. The satellite simulator 145 may also transmit a Synchronous Data Link Control (SDLC) Data signal and may receive an SDLC Clock signal and an IMU Strobe signal from the GPS 140, which may be disregarded during the testing process. In some cases, for example, the satellite simulator 145 is capable of transmitting SDLC data at a maximum rate of about 100 Hz, whereas the DINT 105 can transmit corresponding data signals at a rate of about 600 Hz. In such cases, the SDLC data transmitted by the satellite simulator may be disregarded during the testing process.

Figure 2:
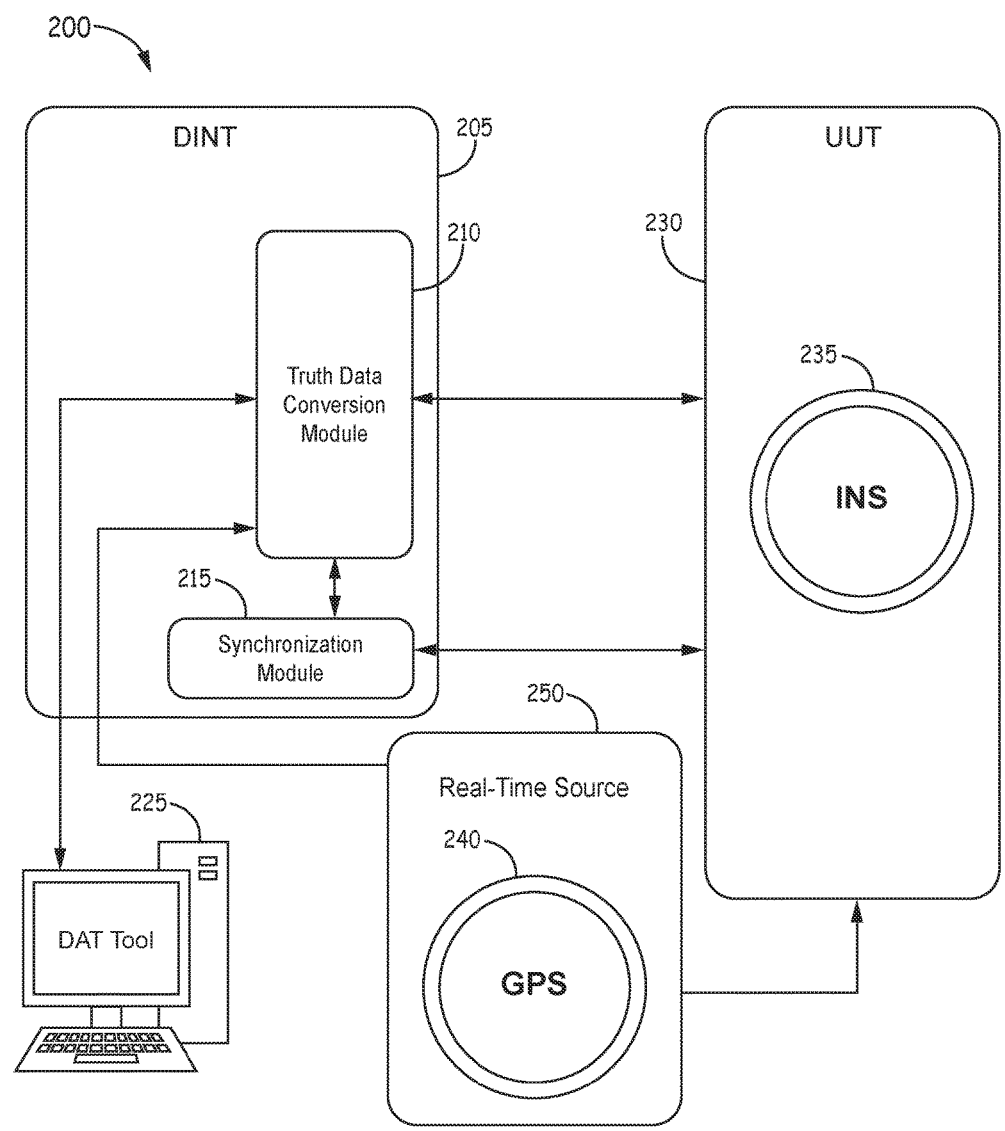
FIG. 2 illustrates a block diagram of an exemplary INS testing system having a DINT and a real-time GPS data source.

FIG. 2 illustrates a block diagram of an exemplary INS testing system 200 having a DINT 205 and a real-time data source 250. In the example shown in FIG. 2, the DINT 205 comprises a truth data conversion module 210 in communication with a synchronization module 215. The DINT 205 is in communication with an external DAT tool 225, a UUT 230, and the real-time data source 250. The UUT 230 comprises an INS 235, and the real-time data source 250 comprises a GPS 240.

During operation, the components of the INS testing system 200 function similarly to the corresponding components of the INS testing system 100 described above in connection with FIG. 1. In the system 200 shown in FIG. 2, however, the truth data source 120 and satellite simulator 145 are replaced with a suitable real-time data source 250, such as, for example, an Embedded GPS/IMU (EGI) or an Attitude Heading Reference System (AHRS).

Example Embodiments

Example 1 includes an Inertial Navigation System (INS) testing system comprising: a Unit Under Test (UUT) comprising an INS module; a DAT tool configured to provide command and control functions to a user; and a Dynamically Integrated Navigation Tester (DINT) in communication with the UUT and the DAT tool, the DINT comprising a truth data conversion module and a synchronization module, wherein the truth data conversion module is configured to receive truth data and convert it to navigation data suitable for transmission to the UUT.

Example 2 includes the INS testing system of Example 1, further comprising a satellite simulator in communication with the UUT and the DINT.

Example 3 includes the INS testing system of any of Examples 1-2, further comprising a real-time GPS data source in communication with the UUT and the DINT.

Example 4 includes the INS testing system of Example 3, wherein the real-time GPS data source comprises an Embedded GPS/IMU (EGI) or an Attitude Heading Reference System (AHRS).

Example 5 includes the INS testing system of any of Examples 1-4, wherein the UUT further comprises a GPS.

Example 6 includes the INS testing system of any of Examples 1-5, wherein the DINT further comprises an interface for receiving truth data from an external memory device.

Example 7 includes the INS testing system of any of Examples 1-6, wherein the DINT comprises a modified version of the UUT.

Example 8 includes the INS testing system of any of Examples 1-7, wherein inertial data is provided by the UUT.

Example 9 includes a Dynamically Integrated Navigation Tester (DINT) comprising: a synchronization module; and a truth data conversion module in communication with the synchronization module, wherein the truth data conversion module is configured to receive truth reference data and convert it to navigation data suitable for transmission to a Unit Under Test (UUT) comprising an Inertial Navigation System (INS) module, wherein the truth data conversion module is configured to receive command and control signals from a DAT tool and transmit corresponding command and control signals to the UUT.

Example 10 includes the DINT of Example 9, wherein the DINT is in communication with a satellite simulator.

Example 11 includes the DINT of any of Examples 9-10, wherein the DINT is configured to receive truth reference data from an external memory device.

Example 12 includes the DINT of Example 11, wherein the external memory device comprises a flash drive.

Example 13 includes the DINT of any of Example 9-12, wherein the DINT is configured to receive truth reference data from a real-time GPS data source.

Example 14 includes the DINT of Example 13, wherein the real-time GPS data source comprises an Embedded GPS/IMU (EGI) or an Attitude Heading Reference System (AHRS).

Example 15 includes the DINT of any of Examples 9-14, wherein the UUT further comprises a GPS.

Example 16 includes the DINT of any of Examples 9-15, wherein the DINT comprises a modified version of the UUT.

Example 17 includes a method of performing an Inertial Navigation System (INS) test, comprising: receiving command and control signals from a user at a Dynamically Integrated Navigation Tester (DINT); receiving truth data at the DINT; converting the truth data to navigation data suitable for transmission to a Unit Under Test (UUT) comprising an INS module; and transmitting the navigation data to the UUT.

Example 18 includes the method of Example 17, further comprising synchronizing one or more timing signals with a satellite simulator.

Example 19 includes the method of any of Examples 17-18, wherein the truth data is received from an external memory device.

Example 20 includes the method of any of Examples 17-19, wherein the truth data is received from a real-time GPS data source.

The systems and methods described above advantageously allow a user to interface with a UUT while providing user-specified dynamic inputs from the DINT with the truth data selected by the user. In addition, the command and control of the system can be accomplished through a digital interface using signals that both the UUT and the DINT can interpret. As a result, the user is advantageously given the flexibility to create and test multiple dynamic environments that can be repeated without leaving the test bench.

What is claimed is:

1. An Inertial Navigation System (INS) testing system comprising:
   a Unit Under Test (UUT) comprising an INS module;
   a DAT tool configured to provide command and control functions to a user; and
   a Dynamically Integrated Navigation Tester (DINT) in communication with the UUT and the DAT tool, the DINT comprising a truth data conversion module and a synchronization module,
   wherein the truth data conversion module is configured to receive truth data and convert it to navigation data suitable for transmission to the UUT.

2. The INS testing system of claim 1, further comprising a satellite simulator in communication with the UUT and the DINT.

3. The INS testing system of claim 1, further comprising a real-time GPS data source in communication with the UUT and the DINT.

4. The INS testing system of claim 3, wherein the real-time GPS data source comprises an Embedded GPS/IMU (EGI) or an Attitude Heading Reference System (AHRS).

5. The INS testing system of claim 1, wherein the UUT further comprises a GPS.

6. The INS testing system of claim 1, wherein the DINT further comprises an interface for receiving truth data from an external memory device.

7. The INS testing system of claim 1, wherein the DINT comprises a modified version of the UUT.

8. The INS testing system of claim 1, wherein inertial data is provided by the UUT.

9. A Dynamically Integrated Navigation Tester (DINT) comprising:
   a synchronization module; and
   a truth data conversion module in communication with the synchronization module,
   wherein the truth data conversion module is configured to receive truth reference data and convert it to navigation data suitable for transmission to a Unit Under Test (UUT) comprising an Inertial Navigation System (INS) module,
   wherein the truth data conversion module is configured to receive command and control signals from a DAT tool and transmit corresponding command and control signals to the UUT.

10. The DINT of claim 9, wherein the DINT is in communication with a satellite simulator.

11. The DINT of claim 9, wherein the DINT is configured to receive truth reference data from an external memory device.

12. The DINT of claim 11, wherein the external memory device comprises a flash drive.

13. The DINT of claim 9, wherein the DINT is configured to receive truth reference data from a real-time GPS data source.

14. The DINT of claim 13, wherein the real-time GPS data source comprises an Embedded GPS/IMU (EGI) or an Attitude Heading Reference System (AHRS).

15. The DINT of claim 9, wherein the UUT further comprises a GPS.

16. The DINT of claim 9, wherein the DINT comprises a modified version of the UUT.

17. A method of performing an Inertial Navigation System (INS) test, comprising:
   receiving command and control signals from a user at a Dynamically Integrated Navigation Tester (DINT);
   receiving truth data at the DINT;
   converting the truth data to navigation data suitable for transmission to a Unit Under Test (UUT) comprising an INS module; and
   transmitting the navigation data to the UUT.

18. The method of claim 17, further comprising synchronizing one or more timing signals with a satellite simulator.

19. The method of claim 17, wherein the truth data is received from an external memory device.

20. The method of claim 17, wherein the truth data is received from a real-time GPS data source.

* * * * *